US010808543B2

(12) United States Patent
Grelotti et al.

(10) Patent No.: US 10,808,543 B2
(45) Date of Patent: Oct. 20, 2020

(54) ROTORS WITH MODULUS MISTUNED AIRFOILS

(71) Applicant: United Technologies Corporation, Hartford, CT (US)

(72) Inventors: Robert A. Grelotti, Colchester, CT (US); Robert J. Morris, Portland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 479 days.

(21) Appl. No.: 14/783,152

(22) PCT Filed: Apr. 9, 2014

(86) PCT No.: PCT/US2014/033407
§ 371 (c)(1),
(2) Date: Oct. 8, 2015

(87) PCT Pub. No.: WO2014/197119
PCT Pub. Date: Dec. 11, 2014

(65) Prior Publication Data
US 2016/0053617 A1 Feb. 25, 2016

Related U.S. Application Data

(60) Provisional application No. 61/812,392, filed on Apr. 16, 2013.

(51) Int. Cl.
*F01D 5/16* (2006.01)
*F01D 5/34* (2006.01)
(Continued)

(52) U.S. Cl.
CPC .............. *F01D 5/16* (2013.01); *F01D 5/10* (2013.01); *F01D 5/34* (2013.01); *F02C 3/04* (2013.01);
(Continued)

(58) Field of Classification Search
CPC ..... F01D 5/16; F01D 5/26; F01D 5/28; F01D 5/3061; F05D 2230/232; F05D 2300/174;
(Continued)

(56) References Cited

U.S. PATENT DOCUMENTS 4,097,192 A 6/1978 Kulina
4,426,867 A * 1/1984 Neal ......................... C21D 7/06
29/889.7

(Continued)

FOREIGN PATENT DOCUMENTS

EP 1752610 A2 2/2007
EP 2161410 A1 3/2010
GB 2490127 A 10/2012

OTHER PUBLICATIONS

International Search Report and Written Opinion for International Application No. PCT/US2014/033407 dated Jan. 26, 2015.
(Continued)

*Primary Examiner* — Todd E Manahan
*Assistant Examiner* — Katheryn A Malatek
(74) *Attorney, Agent, or Firm* — Carlson, Gaskey & Olds, P.C.

(57) ABSTRACT

A rotor assembly for a gas turbine engine includes a rotor defining an outer periphery; and a plurality of blades attached to the outer periphery. The plurality of blades includes a material property different than the other of the plurality of blades to provide mistuning of the rotor.

4 Claims, 4 Drawing Sheets

(51) Int. Cl.
*F01D 5/10* (2006.01)
*F02C 3/04* (2006.01)

(52) U.S. Cl.
CPC ...... *F05D 2220/32* (2013.01); *F05D 2230/60* (2013.01); *F05D 2240/30* (2013.01); *F05D 2260/961* (2013.01); *F05D 2300/609* (2013.01); *Y02T 50/671* (2013.01); *Y02T 50/673* (2013.01)

(58) Field of Classification Search
CPC ........... F05D 2240/30; F05D 2260/961; F04D 29/322; F04D 29/388; F04D 29/666; F04D 29/668
See application file for complete search history.

(56) References Cited

U.S. PATENT DOCUMENTS

| | | | |
|---|---|---|---|
| 5,197,190 A | 3/1993 | Coolidge | |
| 5,299,914 A | 4/1994 | Schilling | |
| 5,474,421 A | 12/1995 | Rossmann | |
| 5,865,364 A | 2/1999 | Trask et al. | |
| 5,993,161 A | 11/1999 | Shapiro | |
| 6,379,112 B1 | 4/2002 | Montgomery | |
| 6,428,278 B1 | 8/2002 | Montgomery et al. | |
| 6,471,482 B2 | 10/2002 | Montgomery et al. | |
| 6,764,384 B1* | 7/2004 | Kleer | B24B 31/064 451/104 |
| 7,500,299 B2* | 3/2009 | Dupeux | F01D 5/10 29/407.07 |
| 7,824,158 B2 | 11/2010 | Bauer et al. | |
| 7,887,299 B2 | 2/2011 | Xiao | |
| 8,043,063 B2 | 10/2011 | Kelly et al. | |
| 8,382,436 B2 | 2/2013 | Ammann | |
| 2003/0223873 A1* | 12/2003 | Carrier | F01D 5/3061 416/213 R |
| 2004/0064945 A1* | 4/2004 | Howley | B23H 9/10 29/889.7 |
| 2007/0036658 A1* | 2/2007 | Morris | F01D 5/16 416/229 A |
| 2008/0304972 A1* | 12/2008 | Xiao | F01D 5/10 416/203 |
| 2009/0104030 A1* | 4/2009 | McMillan | G01N 24/08 415/200 |
| 2010/0124502 A1 | 5/2010 | Brandl et al. | |
| 2012/0237355 A1 | 9/2012 | Zhang et al. | |

OTHER PUBLICATIONS

International Preliminary Report on Patentability for International Application No. PCT/US2014/033407 dated Oct. 29, 2015.
Extended European Search Report for EP Application No. 14808183.9 dated Apr. 15, 2016.

* cited by examiner

ROTORS WITH MODULUS MISTUNED AIRFOILS

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

The fan, compressor and turbine sections include blades supported on a rotor. An integrally bladed rotor (IBR), also commonly referred to as a blisk, includes blades formed in an outer periphery of the rotor. The blades define an airfoil that interacts with airflow through the engine. Vibrational frequencies at or near natural frequencies of adjacent blades in an IBR can result in a reduction in aerodynamic damping and an increase in the likelihood of airfoil flutter. One method of reducing flutter is to mistune the IBR by providing different airfoil shapes to prevent formation of such natural frequencies. However, different airfoil shapes on a common rotor can reduce overall performance, increase rotor weight and may not be desirable for improving engine efficiency and performance.

Turbine engine manufacturers continue to seek further improvements to engine performance including improvements to thermal, transfer and propulsive efficiencies.

SUMMARY

A rotor assembly for a gas turbine engine according to an exemplary embodiment of this disclosure, among other possible things includes a rotor defining an outer periphery, and a plurality of blades arranged on the outer periphery. At least one of the plurality of blades includes a material property different than at least one of the other plurality of blades.

In a further embodiment of the foregoing rotor assembly, the rotor includes an integrally bladed rotor with the plurality of blades welded to the rotor.

In a further embodiment of any of the foregoing rotor assemblies, the rotor includes a plurality of slots receiving root portions of each of the plurality of blades.

In a further embodiment of any of the foregoing rotor assemblies, each of the plurality of blades includes a common geometric shape.

In a further embodiment of any of the foregoing rotor assemblies, the material property includes a material modulus of at least one of the plurality of blades.

In a further embodiment of any of the foregoing rotor assemblies, the material property includes a grain structure. At least one of the plurality of blades includes a grain structure different than at least one of the other of the plurality of blades.

In a further embodiment of any of the foregoing rotor assemblies, the plurality of blades includes alternating blades with differing material properties.

In a further embodiment of any of the foregoing rotor assemblies, the plurality of blades includes a plurality of alternating blades fabricated from a different material.

In a further embodiment of any of the foregoing rotor assemblies, the plurality of blades includes an airfoil.

A gas turbine engine according to an exemplary embodiment of this disclosure, among other possible things includes a compressor section, a combustor in fluid communication with the compressor section, and a turbine section in fluid communication with the combustor. The turbine section drives the compressor section. A rotor is within at least one of the compressor section and turbine section including a plurality of blades. At least one of the plurality of blades includes a material property different than the other of the plurality of blades.

In a further embodiment of the foregoing gas turbine engine, the rotor includes an integrally bladed rotor and each of the plurality of blades is attached to the rotor at a weld joint.

In a further embodiment of any of the foregoing rotor assemblies, the rotor includes a plurality of slots receiving root portions of each of the plurality of blades.

In a further embodiment of any of the foregoing rotor assemblies, each of the plurality of blades includes a common geometric shape.

In a further embodiment of any of the foregoing rotor assemblies, the material property includes a material modulus of at least one of the plurality of blades.

In a further embodiment of any of the foregoing rotor assemblies, the material property includes a grain structure. At least one of the plurality of blades includes a grain structure different than at least one of the other of the plurality of blades.

In a further embodiment of any of the foregoing rotor assemblies, the plurality of blades includes alternating blades with differing material properties.

In a further embodiment of any of the foregoing rotor assemblies, the plurality of blades includes a plurality of alternating blades fabricated from a different material.

In a further embodiment of any of the foregoing rotor assemblies, includes a fan section and the rotor includes a fan rotor supporting a plurality of fan blades.

A method of fabricating a bladed rotor according to an exemplary embodiment of this disclosure, among other possible things includes forming a rotor to include an outer periphery, forming a first blade to include a first material characteristic, forming a second blade to include a second material characteristic different than the first material characteristic, assembling the first blade to the rotor, assembling the second blade to the rotor relative to the first blade to provide a desired mistune of the bladed rotor.

In a further embodiment of the foregoing method, the bladed rotor includes an integrally bladed rotor and the method includes the steps of bonding the first blade to the rotor, and bonding the second blade to the rotor relative to the first blade to provide a desired mistune of the integrally bladed rotor.

In a further embodiment of any of the foregoing methods, includes inertia bonding the first blade and the second blade to the rotor.

In a further embodiment of any of the foregoing methods, includes forming a plurality of first blades and a second plurality of second blades and bonding the first plurality of blades and the second plurality of blades to the rotor to provide a desired mistuning of the rotor.

In a further embodiment of any of the foregoing methods, the first material characteristic includes a first modulus and the second material characteristic includes a second modulus different than the first modulus.

In a further embodiment of any of the foregoing methods, includes first forging process for forming the first blade with the first modulus and a second forging process for forming the second blade with the second modulus.

In a further embodiment of any of the foregoing methods, includes forming the first blade and the second blade to include an identical geometric shape.

In a further embodiment of any of the foregoing methods, the first blade includes a first material composition and the second blade includes a second material composition different than the first material.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
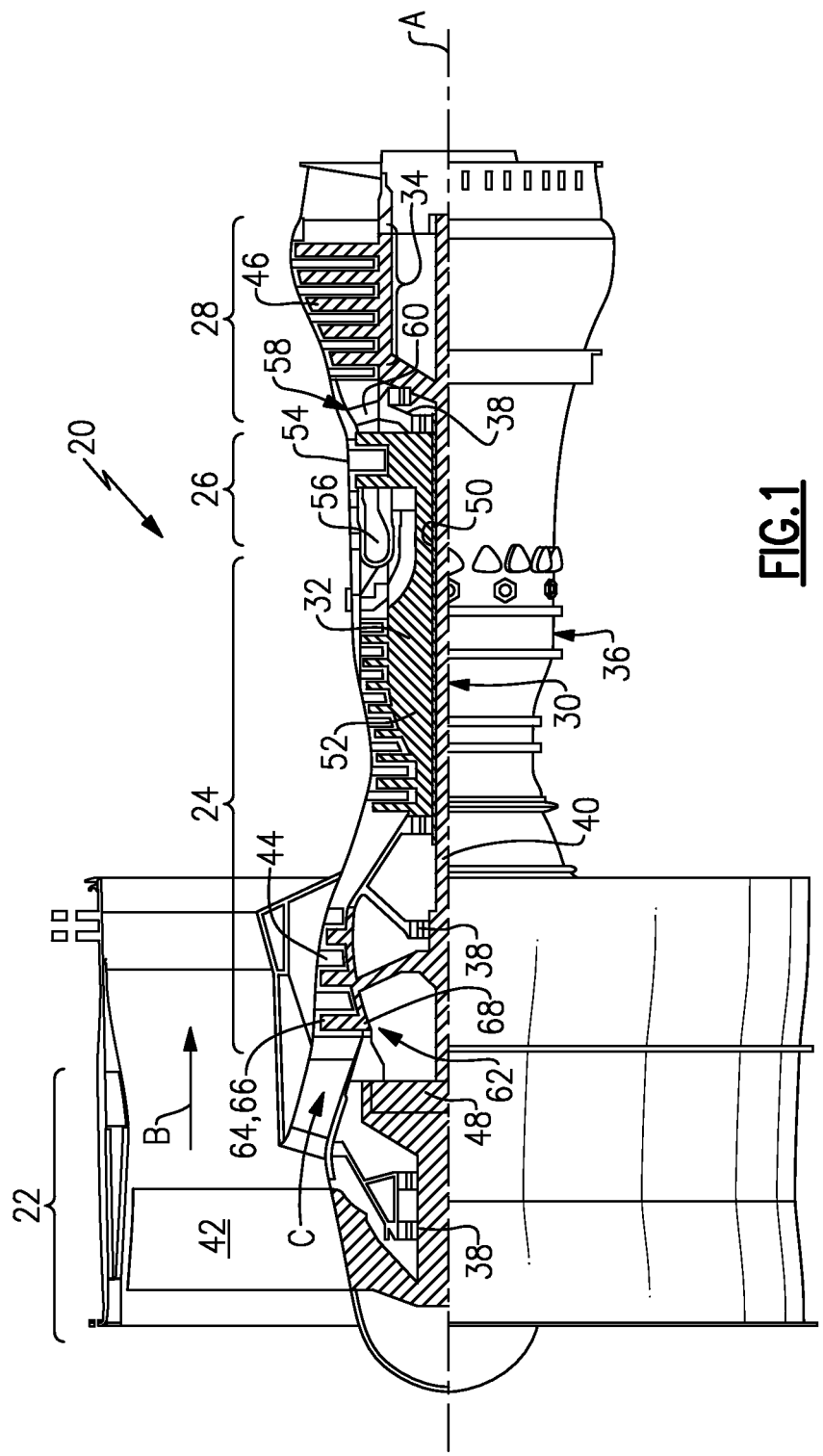
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan section 22 and a low pressure (or first) compressor section 44 to a low pressure (or first) turbine section 46. The inner shaft 40 drives the fan section 22 through a speed change device, such as a geared architecture 48, to drive the fan section 22 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second.

The example gas turbine engine includes the fan section 22 that comprises in one non-limiting embodiment less than about twenty-six (26) fan blades 42. In another non-limiting embodiment, the fan section 22 includes less than about twenty (20) fan blades 42. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The compressor section 24 includes a rotor assembly 62 including a hub 68 and a plurality of blades 64, 66. The example rotor assembly 62 is an integrally bladed rotor (IBR) that includes the blades 64, 66 as an integral part of the hub 68. The blades 64, 66 are airfoils with a common geometric shape and different material properties to provide a desired mistuning of the fan rotor assembly 62 that reduces high cycle fatigue excitation.

Figure 2:
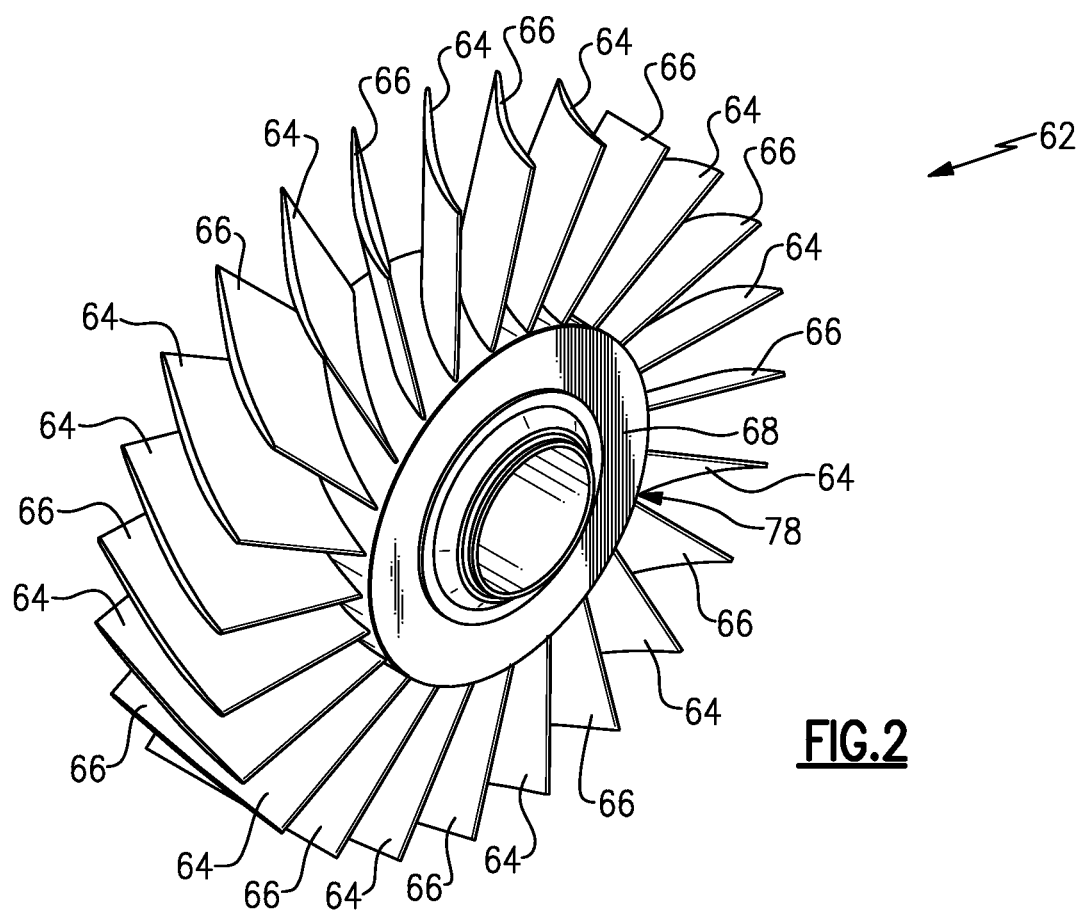
FIG. 2 is a perspective view of an example rotor assembly.

Referring to FIG. 2 with continued reference to FIG. 1, the example rotor assembly 62 includes a first plurality of blades 64 and a second plurality of blades 66. Each of the blades 64, 66 include an identical geometric shape. In this example, the blades 64 and 66 define an airfoil including a leading edge 80, trailing edge 82, pressure side 84 and suction side 86. The example blades 64, 66 are formed separately and then bonded to a periphery 78 of the hub 68.

It should be understood that although a rotor assembly 62 within the compressor section 24 is described by way of example other rotor hubs for different portions of the turbine engine 20 are also within the contemplation of this disclosure. For example, a rotor assembly according to this disclosure may be utilized within the fan section 22 and the turbine section 28.

Each of the plurality of first blades 64 and the plurality of second blades 66 are formed to include different material characteristics. Each of the first fan blades 64 include a first material characteristic schematically indicated at 88 and each of the second blades 66 include a second material characteristic schematically indicated at 90 that is different than the first material characteristic 88.

The blades 64, 66 are attached to the hub 68 in alternating positions about the periphery 78 of the hub 68. Accordingly, each of the first blades 64 is disposed between second blades 66, and each of the second fan blades 66 is disposed between first blades 64.

In one disclosed example, the first and second material characteristics 88, 90 are an elastic modulus if the material forming the blades 64, 66. The elastic modulus, also referred to as Young's modulus is a measure of the stiffness of a material and is generally defined as a ratio of stress along an axis divided by a strain along the same axis within a range of stress in which Hooks Law holds. In this example, the first plurality of blades 64 each include a first Young's modulus that is different than a second Young's modulus for the each of the second plurality of blades 66. The difference between the first Young's modulus and the second Young's modulus is sufficient to produce different excitation frequencies.

Because each of the blades 64, 66 include a different Young's modulus and thereby different excitation frequencies, each the blades 64, 66 react to different natural frequency. The different natural frequencies in turn prevent the blades 64, 66 of the rotor assembly 62 from achieving a common natural vibration frequency within a common phase. By preventing a natural vibration frequency within the rotor assembly 62, flutter and other life reducing high frequency excitations are prevented.

The different material characteristics 88, 90 of each of the first blades 64 and the second blades 66 can be achieved by utilizing different material compositions while maintaining a common geometric shape. Each material composition may be chosen to provide a different Young's modulus and therefore different natural vibration frequencies that will prevent flutter from occurring in the example rotor assembly 62.

Moreover, the disclosed example first blade 64 and second blade 66 may be fabricated utilizing different processes that generate different grain or material structures.

Figure 3:
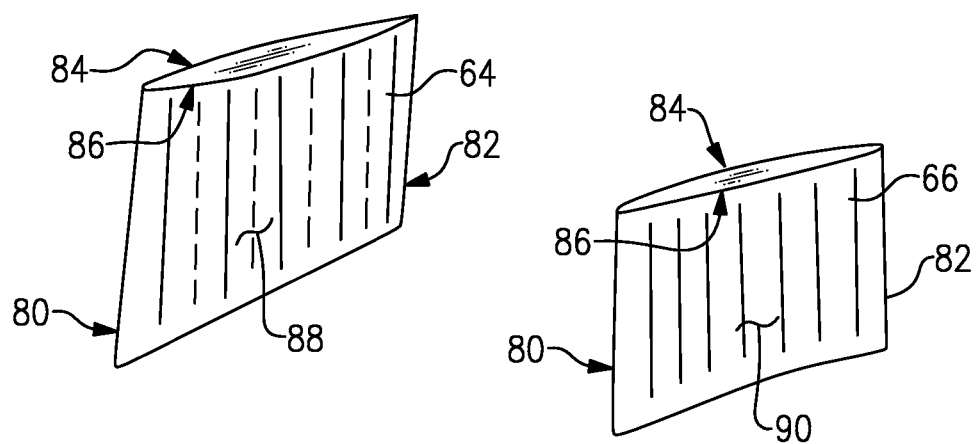
FIG. 3 is an example view of two example blade assemblies.
Figure 4:
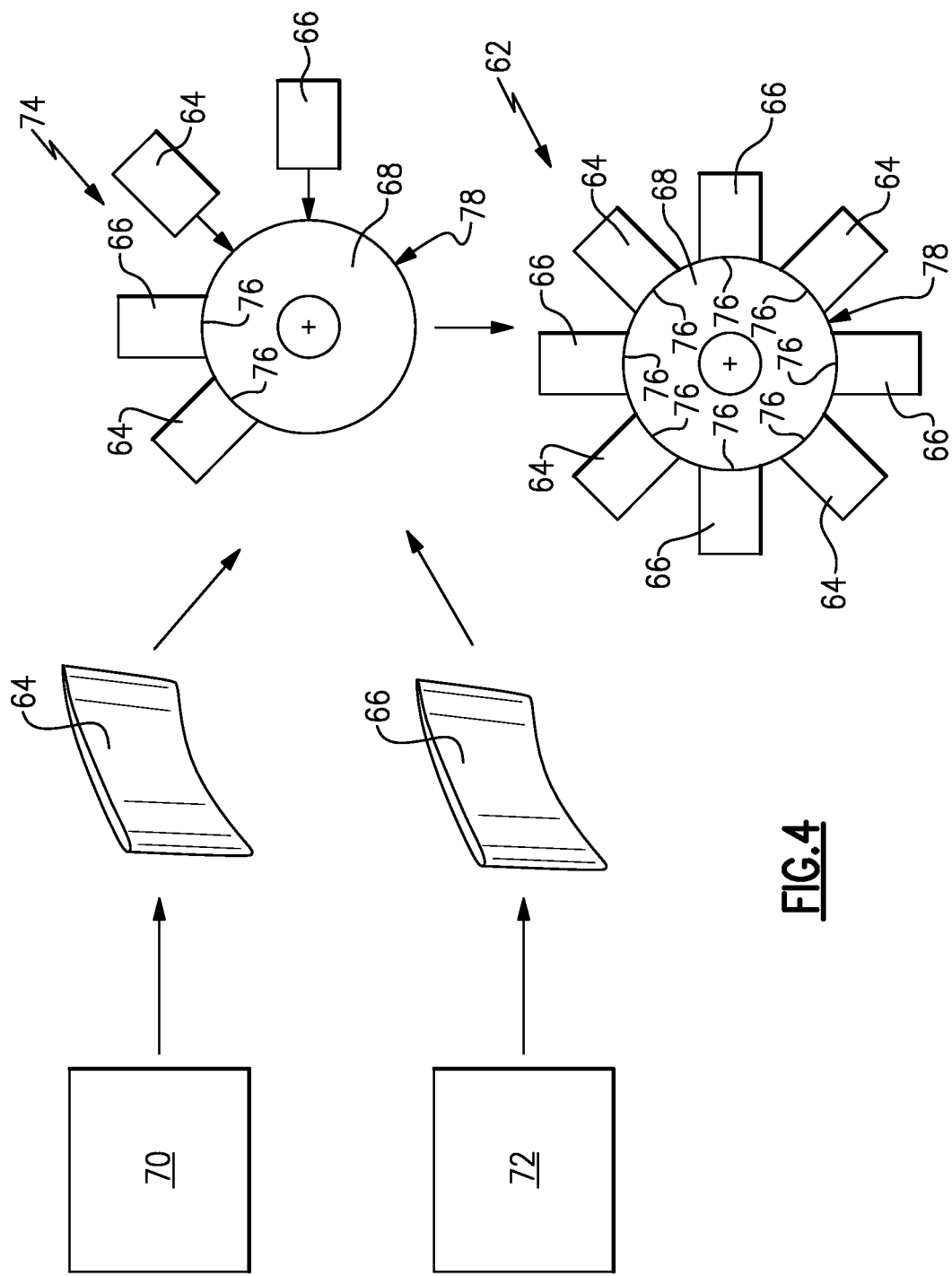
FIG. 4 is a schematic representation of a method of constructing an integrally bladed mistuned rotor assembly

Referring to FIG. 4 with continued reference to FIGS. 2 and 3, the example rotor assembly 62 is fabricated utilizing different identically shaped blades 64, 66 that are formed utilizing different processes to provide the different material characteristics 88, 90. In this example, the first blade 64 is formed utilizing a first process 70 and the second blade 66 is fabricated utilizing a second process 72.

The example first process 70 is a cross-rolled forging process and the second process 72 is a closed die forging process. Both of the first blade 64 and the second blade 66 include a common material and common geometric shape within acceptable production tolerances. However, because each of the blades 64, 66 are formed utilizing different processes that generate the desired different material characteristics 88, 90. In the disclosed example, the different material characteristics are different Young's modulus. The different Young's modulus can be produced by providing differing grain structure orientation or size, along with other process specific parameters that affect the blade final material properties.

Once a sufficient number of first and second blades 64, 66 are fabricated they are attached to the periphery 78 the hub 68 in a joining step generally indicated at 74. In this example, the blade 64, 66 are attached to the hub 68 utilizing an inertia bonding process. The example bonding process may also include other bonding processes such as linear friction welding or other processes that are compatible with the hub and blade materials.

The blades 64 and 66 are attached to the hub 68 at weld joints 76. In this example, the blades 64 and 66 are attached to the hub 68 in an alternating fashion where each of the first blades 66 are disposed between two second blades 64 and the second blades 64 are disposed between first blades 66. As appreciated, although in this example the first and second blades 64, 66 are alternately disposed about the periphery 78 of the hub 68, the blades 64, 66 may also be orientated differently to provide the desired mistuning of the rotor assembly 62. Moreover, although equal numbers of first blades 64 and second blades 66 are disclosed, more of the first and second blades 64, 66 could be utilized to tailor rotor assembly 62 mistuning for application specific performance requirements.

In this example, the first blade 64 and the second blade 66 are formed utilizing the forging processes 70, 72. Forging processes utilizes localized compressive forces that provide a desired shape of the blades 64, 66. As appreciated, different forging processes can be utilized to provide localized compressive forces in a way that defines a material characteristic that defines different natural vibrational frequencies to prevent and/or reduce the generation of a harmonic frequency within the rotor assembly 62 to prevent fluttering and other potential instabilities of the rotor assembly 62.

Figure 5:
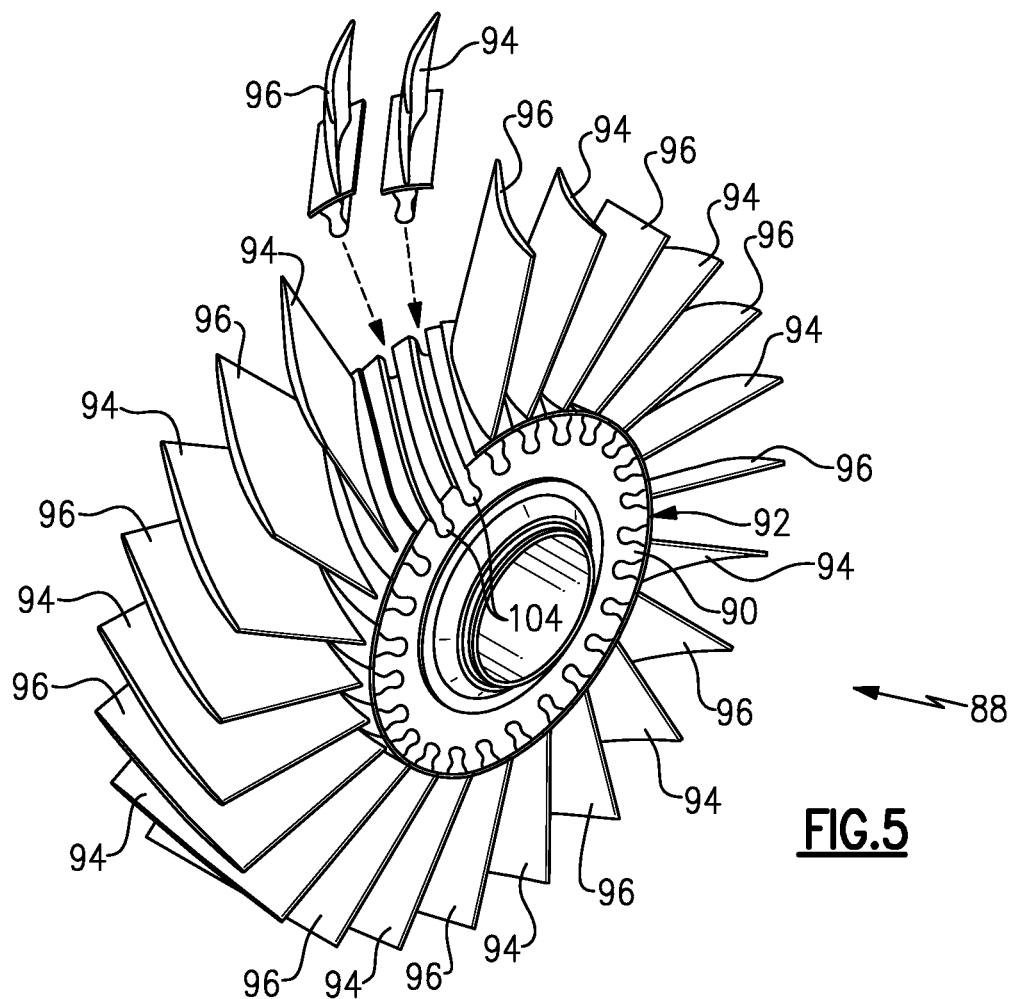
FIG. 5 is a perspective view of another example rotor assembly.
Figures 6A, 6B:
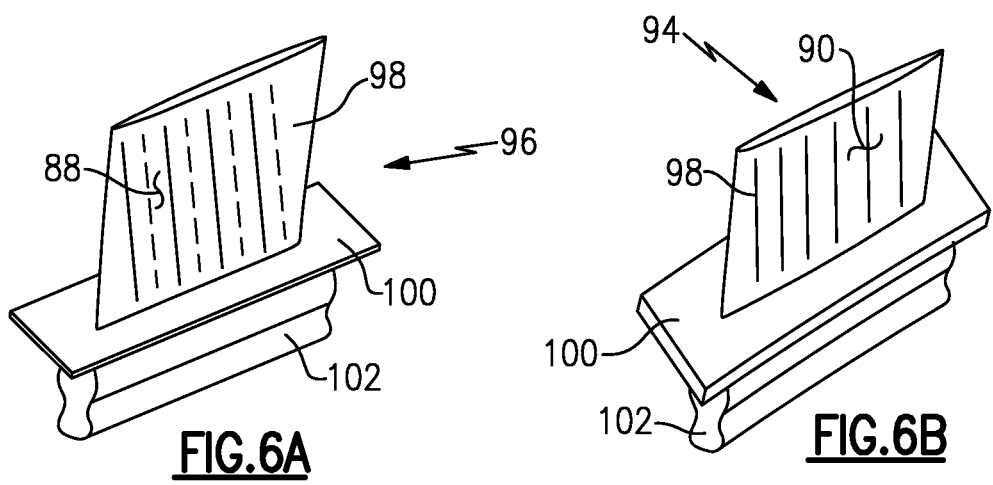
FIG. 6A is a perspective view of an example blade assembly.
FIG. 6B is a perspective view of another example blade assembly.

Referring to FIGS. 5, 6A and 6B, another example rotor assembly 88 includes a hub 90 with an outer periphery 92 having a plurality of slots 104. The slots 104 receive a root portion 102 of first and second blades 94, 96. Accordingly, the example hub assembly 88 receives the first and second blades 95, 96 within the slots rather than bonding the blades to the outer periphery with a weld joint.

Each of the first and second blades 94, 96 include an airfoil 98 that extends radially outward from a platform 100. The root portion 102 extends radially inward from the platform 100. Each of the first and second blades 94, 96 include a common geometric shape.

The first blades 94 include a first material characteristic and the second blades 96 include a second material characteristic. The different material characteristics 88, 90 of each of the first blades 94 and the second blades 96 can be achieved by utilizing different material compositions while maintaining a common geometric shape. Each material composition may be chosen to provide a different Young's modulus and therefore different natural vibration frequencies that will prevent flutter from occurring in the example rotor assembly 88.

Accordingly, the disclosed rotor assemblies are mistuned utilizing different material characteristics rather than including different shaped blades.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of fabricating a bladed rotor comprising:
   forming an integrally bladed rotor to include an outer periphery;
   forming a first blade from a first material to include a first grain structure and a first Young's modulus;
   forming a second blade from the first material to include a second grain structure and a second Young's modulus different than the first grain structure and the first Young's modulus, wherein forming the first blade includes forming the first blade to have a geometric shape identical to a geometric shape of the second blade utilizing a first forging process for forming the first blade with the first modulus and utilizing a second forging process for forming the second blade with the second modulus; and
   bonding the first blade to the rotor; and
   bonding the second blade to the rotor relative to the first blade to provide a mistune of the integrally bladed rotor.

2. The method as recited in claim 1, including inertia bonding the first blade and the second blade to the integrally bladed rotor.

3. The method as recited in claim 1, wherein the first blade comprises a first plurality of first blades and the second blade comprises a second plurality of second blades and including forming the first plurality of the first blades and the second plurality of the second blades and bonding the first plurality of first blades and the second plurality of second blades to the rotor to provide the mistune of the integrally bladed rotor.

4. The method as recited in claim 3, wherein the first plurality of blades alternates with the second plurality of blades about the outer periphery of the rotor.

* * * * *